United States Patent
Hartog et al.

(10) Patent No.: US 9,329,893 B2
(45) Date of Patent: May 3, 2016

(54) METHOD FOR RESUMING AN APD WAVEFRONT IN WHICH A SUBSET OF ELEMENTS HAVE FAULTED

(75) Inventors: Robert Scott Hartog, Windemere, FL (US); Ralph Clay Taylor, Deland, FL (US); Michael Mantor, Orlando, FL (US); Thomas R. Woller, Austin, TX (US); Kevin McGrath, Los Gatos, CA (US); Sebastien Nussbaum, Lexington, MA (US); Nuwan Jayasena, Sunnyvale, CA (US); Rex McCrary, Oviedo, FL (US); Philip J. Rogers, Pepperell, MA (US); Mark Leather, Los Gatos, CA (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 909 days.

(21) Appl. No.: 13/325,298

(22) Filed: Dec. 14, 2011

(65) Prior Publication Data

US 2013/0160019 A1    Jun. 20, 2013

(51) Int. Cl.
  *G06F 15/16* (2006.01)
  *G06F 15/00* (2006.01)
  *G06T 1/00* (2006.01)
  *G06F 9/48* (2006.01)

(52) U.S. Cl.
  CPC .................................. *G06F 9/4843* (2013.01)

(58) Field of Classification Search
  CPC ...................... G06F 1/00; G06T 1/00–1/0092
  USPC ......................................................... 345/501
  See application file for complete search history.

(56) References Cited

U.S. PATENT DOCUMENTS

| | | | |
|---|---|---|---|
| 8,850,436 B2 * | 9/2014 | Fahs et al. ..................... | 718/102 |
| 2003/0182353 A1 * | 9/2003 | Flanigan et al. ............... | 709/104 |
| 2007/0030280 A1 * | 2/2007 | Paltashev et al. ............. | 345/506 |
| 2011/0050713 A1 * | 3/2011 | McCrary et al. .............. | 345/522 |
| 2012/0131596 A1 * | 5/2012 | Lefebvre et al. .............. | 718/106 |

* cited by examiner

*Primary Examiner* — Jacinta M Crawford
(74) *Attorney, Agent, or Firm* — Volpe and Koenig, P.C.

(57) ABSTRACT

A method resumes an accelerated processing device (APD) wavefront in which a subset of elements have faulted. A restore command for a job including a wavefront is received. A list of context states for the wavefront is read from a memory associated with a APD. An empty shell wavefront is created for restoring the list of context states. A portion of not acknowledged data is masked over a portion of acknowledged data within the restored wavefronts.

13 Claims, 7 Drawing Sheets

600

| | TH1 | TH2 | TH3 | TH4 | TH5 | TH6 | TH... | THN |
|---|---|---|---|---|---|---|---|---|
| empty shell WF | | | | | | | | |

602

| | TH1 | TH2 | TH3 | TH4 | TH5 | TH6 | TH... | THN |
|---|---|---|---|---|---|---|---|---|
| Res WF | 1 | 1 | 1 | 1 | 0 | 0 | 0 | 0 |

604

| | TH4 | TH5 | TH6 | TH... | THN | TH N+1 | TH N+2 | TH N+3 |
|---|---|---|---|---|---|---|---|---|
| Mask WF | 0 | 0 | 0 | 0 | 0 | 0 | 0 | 0 |

METHOD FOR RESUMING AN APD WAVEFRONT IN WHICH A SUBSET OF ELEMENTS HAVE FAULTED

BACKGROUND

1. Field of the Invention

The present invention is generally directed to computing systems. More particularly, the present invention is directed to resuming an accelerated processing device wavefront in which a subset of elements have faulted within the computing system.

2. Background Art

The desire to use a graphics processing unit (GPU) for general computation has become much more pronounced recently due to the GPU's exemplary performance per unit power and/or cost. The computational capabilities for GPUs, generally, have grown at a rate exceeding that of the corresponding central processing unit (CPU) platforms. This growth, coupled with the explosion of the mobile computing market (e.g., notebooks, mobile smart phones, tablets, etc.) and its necessary supporting server/enterprise systems, has been used to provide a specified quality of desired user experience. Consequently, the combined use of CPUs and GPUs for executing workloads with data parallel content is becoming a volume technology.

However, GPUs have traditionally operated in a constrained programming environment, available primarily for the acceleration of graphics. These constraints arose from the fact that GPUs did not have as rich a programming ecosystem as CPUs. Their use, therefore, has been mostly limited to two dimensional (2D) and three dimensional (3D) graphics and a few leading edge multimedia applications, which are already accustomed to dealing with graphics and video application programming interfaces (APIs).

With the advent of multi-vendor supported OpenCL® and DirectCompute®, standard APIs and supporting tools, the limitations of the GPUs in traditional applications has been extended beyond traditional graphics. Although OpenCL and DirectCompute are a promising start, there are many hurdles remaining to creating an environment and ecosystem that allows the combination of a CPU and a GPU to be used as fluidly as the CPU for most programming tasks.

Existing computing systems often include multiple processing devices. For example, some computing systems include both a CPU and a GPU on separate chips (e.g., the CPU might be located on a motherboard and the GPU might be located on a graphics card) or in a single chip package. Both of these arrangements, however, still include significant challenges associated with (i) separate memory systems, (ii) efficient scheduling, (iii) providing quality of service (QoS) guarantees between processes, (iv) programming model, and (v) compiling to multiple target instruction set architectures (ISAs)—all while minimizing power consumption.

For example, the discrete chip arrangement forces system and software architects to utilize chip to chip interfaces for each processor to access memory. While these external interfaces (e.g., chip to chip) negatively affect memory latency and power consumption for cooperating heterogeneous processors, the separate memory systems (i.e., separate address spaces) and driver managed shared memory create overhead that becomes unacceptable for fine grain offload.

Both the discrete and single chip arrangements can limit the types of commands that can be sent to the GPU for execution. By way of example, computational commands (e.g., physics or artificial intelligence commands) often cannot be sent to the GPU for execution. This limitation exists because the CPU may relatively quickly require the results of the operations performed by these computational commands. However, because of the high overhead of dispatching work to the GPU in current systems and the fact that these commands may have to wait in line for other previously-issued commands to be executed first, the latency incurred by sending computational commands to the GPU is often unacceptable.

Given that a conventional GPU may not efficiently execute some computational commands, the commands must then be executed within the CPU. Having to execute the commands on the CPU increases the processing burden on the CPU and can hamper overall system performance.

Although conventional GPUs provide excellent opportunities for computational offloading, such GPUs may not be suitable for system-software-driven process management that is desired for efficient operation in some multi-processor environments. These limitations can create several problems.

For example, since processes cannot be efficiently identified and/or preempted, a rogue process can occupy the GPU hardware for arbitrary amounts of time. In other cases, the ability to context switch off the hardware is severely constrained—occurring at very coarse granularity and only at a very limited set of points in a program's execution. This constraint exists because saving the necessary architectural and microarchitectural states for restoring and resuming a process is not supported. Lack of support for precise exceptions prevents a faulted job from being context switched out and restored at a later point, resulting in lower hardware usage as the faulted threads occupy hardware resources and sit idle during fault handling.

Tasks being executed within a GPU have graphics wavefronts that have a plurality of thread operations being processed. Often a subset of threads in a wavefront may have a number of operations that have not yet been acknowledged when a context switch is requested. Therefore, when execution of the wavefront resumes, all threads, including those previously acknowledged, must be retried. Such retying all of the threads in the wavefront causes an increased latency for the GPU resources.

SUMMARY OF EMBODIMENTS

What is needed, therefore, are methods and systems for resuming a wavefront in a graphics processing unit in which only a subset of faulted elements are retried.

Embodiments of the present invention, in certain circumstances, provide a method including, responsive to a command to restore a partially completed wavefront, restoring resources for the partially completed wavefront masking a portion of said restored partially completed wavefront.

Although GPUs, accelerated processing units (APUs), and general purpose use of the graphics processing unit (GPGPU) are commonly used terms in this field, the expression "accelerated processing device (APD)" is considered to be a broader expression. For example, APD refers to any cooperating collection of hardware and/or software that performs those functions and computations associated with accelerating graphics processing tasks, data parallel tasks, or nested data parallel tasks in an accelerated manner compared to conventional CPUs, conventional GPUs, software and/or combinations thereof.

Additional features and advantages of the invention, as well as the structure and operation of various embodiments of the invention, are described in detail below with reference to the accompanying drawings. It is noted that the invention is not limited to the specific embodiments described herein.

Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art to make and use the invention. Various embodiments of the present invention are described below with reference to the drawings, wherein like reference numerals are used to refer to like elements throughout.

FIG. 6 is an illustrative block diagram illustration of wavefront structures.

DETAILED DESCRIPTION OF THE EMBODIMENTS

In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "embodiments of the invention" does not require that all embodiments of the invention include the discussed feature, advantage or mode of operation. Alternate embodiments may be devised without departing from the scope of the invention, and well-known elements of the invention may not be described in detail or may be omitted so as not to obscure the relevant details of the invention. In addition, the terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1A:
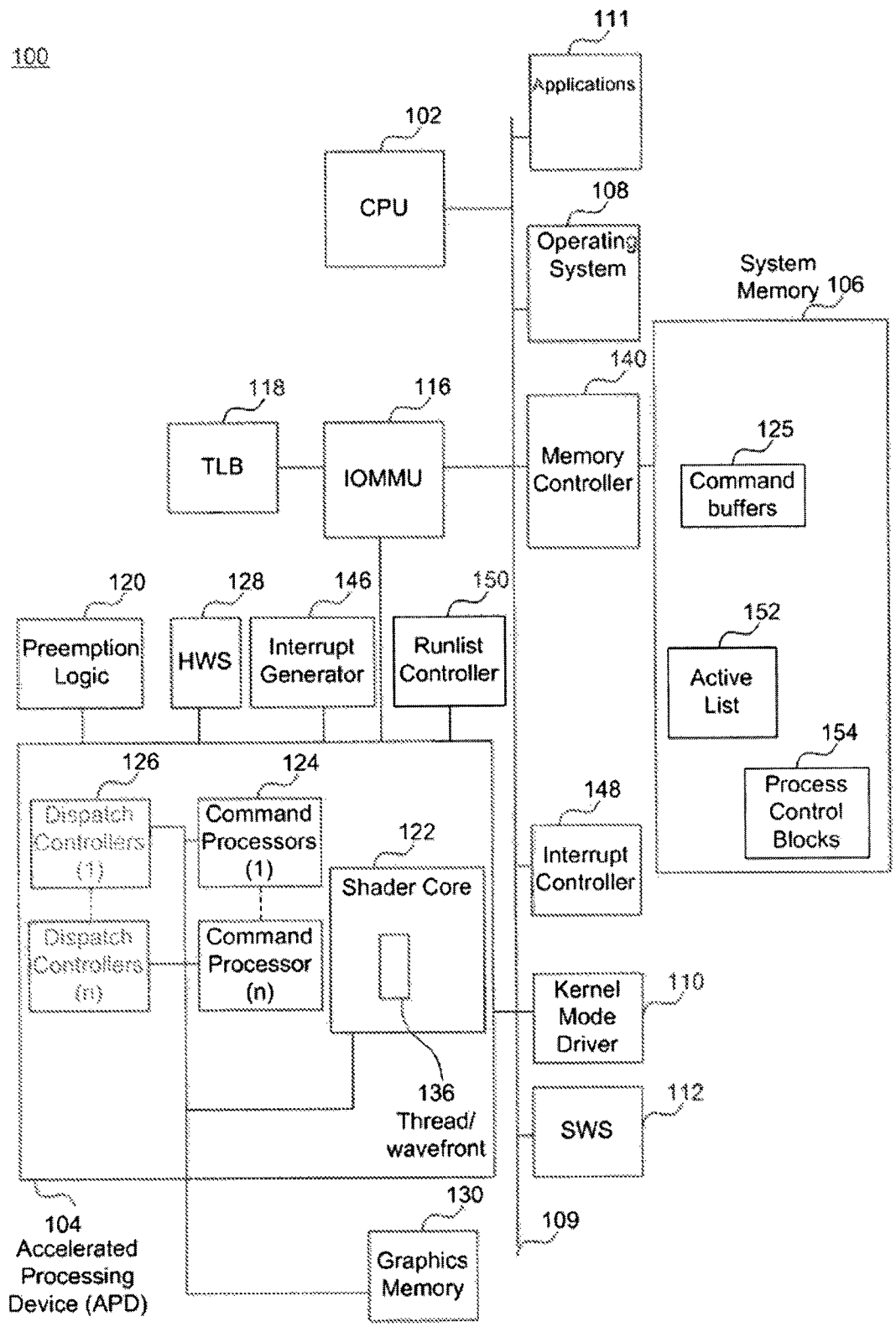
FIG. 1A is an illustrative block diagram of a processing system in accordance with embodiments of the present invention.

FIG. 1A is an exemplary illustration of a unified computing system 100 including two processors, a CPU 102 and an APD 104. CPU 102 can include one or more single or multi core CPUs. In one embodiment of the present invention, the system 100 is formed on a single silicon die or package, combining CPU 102 and APD 104 to provide a unified programming and execution environment. This environment enables the APD 104 to be used as fluidly as the CPU 102 for some programming tasks. However, it is not an absolute requirement of this invention that the CPU 102 and APD 104 be formed on a single silicon die. In some embodiments, it is possible for them to be formed separately and mounted on the same or different substrates.

In one example, system 100 also includes a memory 106, an operating system 108, and a communication infrastructure 109. The operating system 108 and the communication infrastructure 109 are discussed in greater detail below.

The system 100 also includes a kernel mode driver (KMD) 110, a software scheduler (SWS) 112, and a memory management unit 116, such as input/output memory management unit (IOMMU). Components of system 100 can be implemented as hardware, firmware, software, or any combination thereof. A person of ordinary skill in the art will appreciate that system 100 may include one or more software, hardware, and firmware components in addition to, or different from, that shown in the embodiment shown in FIG. 1A.

In one example, a driver, such as KMD 110, typically communicates with a device through a computer bus or communications subsystem to which the hardware connects. When a calling program invokes a routine in the driver, the driver issues commands to the device. Once the device sends data back to the driver, the driver may invoke routines in the original calling program. In one example, drivers are hardware-dependent and operating-system-specific. They usually provide the interrupt handling required for any necessary asynchronous time-dependent hardware interface.

Device drivers, particularly on modern Microsoft Windows® platforms, can run in kernel-mode (Ring 0) or in user-mode (Ring 3). The primary benefit of running a driver in user mode is improved stability, since a poorly written user mode device driver cannot crash the system by overwriting kernel memory. On the other hand, user/kernel-mode transitions usually impose a considerable performance overhead, thereby prohibiting user mode-drivers for low latency and high throughput requirements. Kernel space can be accessed by user module only through the use of system calls. End user programs like the UNIX shell or other GUI based applications are part of the user space. These applications interact with hardware through kernel supported functions.

CPU 102 can include (not shown) one or more of a control processor, field programmable gate array (FPGA), application specific integrated circuit (ASIC), or digital signal processor (DSP). CPU 102, for example, executes the control logic, including the operating system 108, KMD 110, SWS 112, and applications 111, that control the operation of computing system 100. In this illustrative embodiment, CPU 102, according to one embodiment, initiates and controls the execution of applications 111 by, for example, distributing the processing associated with that application across the CPU 102 and other processing resources, such as the APD 104.

APD 104, among other things, executes commands and programs for selected functions, such as graphics operations and other operations that may be, for example, particularly suited for parallel processing. In general, APD 104 can be frequently used for executing graphics pipeline operations, such as pixel operations, geometric computations, and rendering an image to a display. In various embodiments of the present invention, APD 104 can also execute compute processing operations (e.g., those operations unrelated to graphics such as, for example, video operations, physics simulations, computational fluid dynamics, etc.), based on commands or instructions received from CPU 102.

For example, commands can be considered as special instructions that are not typically defined in the instruction set architecture (ISA). A command may be executed by a special processor such a dispatch processor, command processor, or network controller. On the other hand, instructions can be considered, for example, a single operation of a processor within a computer architecture. In one example, when using two sets of ISAs, some instructions are used to execute x86 programs and some instructions are used to execute kernels on an APD unit.

In an illustrative embodiment, CPU 102 transmits selected commands to APD 104. These selected commands can include graphics commands and other commands amenable to parallel execution. These selected commands, that can also include compute processing commands, can be executed substantially independently from CPU 102.

APD 104 can include its own compute units (not shown), such as, but not limited to, one or more SIMD processing cores. As referred to herein, a SIMD is a pipeline, or programming model, where a kernel is executed concurrently on multiple processing elements each with its own data and a shared program counter. All processing elements execute an identical set of instructions. The use of predication enables work-items to participate or not for each issued command.

In one example, each APD 104 compute unit can include one or more scalar and/or vector floating-point units and/or arithmetic and logic units (ALUs). The APD compute unit can also include special purpose processing units (not shown), such as inverse-square root units and sine/cosine units. In one example, the APD compute units are referred to herein collectively as shader core 122.

Having one or more SIMDs, in general, makes APD 104 ideally suited for execution of data-parallel tasks such as those that are common in graphics processing.

Some graphics pipeline operations, such as pixel processing, and other parallel computation operations, can require that the same command stream or compute kernel be performed on streams or collections of input data elements. Respective instantiations of the same compute kernel can be executed concurrently on multiple compute units in shader core 122 in order to process such data elements in parallel. As referred to herein, for example, a compute kernel is a function containing instructions declared in a program and executed on an APD. This function is also referred to as a kernel, a shader, a shader program, or a program.

In one illustrative embodiment, each compute unit (e.g., SIMD processing core) can execute a respective instantiation of a particular work-item to process incoming data. A work-item is one of a collection is of parallel executions of a kernel invoked on a device by a command. A work-item can be executed by one or more processing elements as part of a work-group executing on a compute unit.

A work-item is distinguished from other executions within the collection by its global ID and local ID. In one example, a subset of work-items in a workgroup that execute simultaneously together on a SIMD can be referred to as a wavefront 136. The width of a wavefront is a characteristic of the hardware of the compute unit (e.g., SIMD processing core). As referred to herein, a workgroup is a collection of related work-items that execute on a single compute unit. The work-items in the group execute the same kernel and share local memory and work-group barriers.

In the exemplary embodiment, all wavefronts from a workgroup are processed on the same SIMD processing core. Instructions across a wavefront are issued one at a time, and when all work-items follow the same control flow, each work-item executes the same program. Wavefronts can also be referred to as warps, vectors, or threads.

An execution mask and work-item predication are used to enable divergent control flow within a wavefront, where each individual work-item can actually take a unique code path through the kernel. Partially populated wavefronts can be processed when a full set of work-items is not available at wavefront start time. For example, shader core 122 can simultaneously execute a predetermined number of wavefronts 136, each wavefront 136 comprising a multiple work-items.

Within the system 100, APD 104 includes its own memory, such as graphics memory 130 (although memory 130 is not limited to graphics only use). Graphics memory 130 provides a local memory for use during computations in APD 104. Individual compute units (not shown) within shader core 122 can have their own local data store (not shown). In one embodiment, APD 104 includes access to local graphics memory 130, as well as access to the memory 106. In another embodiment, APD 104 can include access to dynamic random access memory (DRAM) or other such memories (not shown) attached directly to the APD 104 and separately from memory 106.

In the example shown, APD 104 also includes one or "n" number of command processors (CPs) 124. CP 124 controls the processing within APD 104. CP 124 also retrieves commands to be executed from command buffers 125 in memory 106 and coordinates the execution of those commands on APD 104.

In one example, CPU 102 inputs commands based on applications 111 into appropriate command buffers 125. As referred to herein, an application is the combination of the program parts that will execute on the compute units within the CPU and APD.

A plurality of command buffers 125 can be maintained with each process scheduled for execution on the APD 104.

CP 124 can be implemented in hardware, firmware, or software, or a combination thereof. In one embodiment, CP 124 is implemented as a reduced instruction set computer (RISC) engine with microcode for implementing logic including scheduling logic.

APD 104 also includes one or "n" number of dispatch controllers (DCs) 126. In the present application, the term dispatch refers to a command executed by a dispatch controller that uses the context state to initiate the start of the execution of a kernel for a set of work groups on a set of compute units. DC 126 includes logic to initiate workgroups in the shader core 122. In some embodiments, DC 126 can be implemented as part of CP 124.

System 100 also includes a hardware scheduler (HWS) 128 for selecting a process from a run list 150 for execution on APD 104. HWS 128 can select processes from run list 150 using round robin methodology, priority level, or based on other scheduling policies. The priority level, for example, can be dynamically determined. HWS 128 can also include functionality to manage the run list 150, for example, by adding new processes and by deleting existing processes from run-list 150. The run list management logic of HWS 128 is sometimes referred to as a run list controller (RLC).

In various embodiments of the present invention, when HWS 128 initiates the execution of a process from run list 150, CP 124 begins retrieving and executing commands from the corresponding command buffer 125. In some instances, CP 124 can generate one or more commands to be executed within APD 104, which correspond with commands received from CPU 102. In one embodiment, CP 124, together with other components, implements a prioritizing and scheduling of commands on APD 104 in a manner that improves or maximizes the utilization of the resources of APD 104 resources and/or system 100.

APD 104 can have access to, or may include, an interrupt generator 146. Interrupt generator 146 can be configured by APD 104 to interrupt the operating system 108 when interrupt events, such as page faults, are encountered by APD 104. For example, APD 104 can rely on interrupt generation logic within IOMMU 116 to create the page fault interrupts noted above.

APD 104 can also include preemption and context switch logic 120 for preempting a process currently running within shader core 122. Context switch logic 120, for example, includes functionality to stop the process and save its current state (e.g., shader core 122 state, and CP 124 state).

As referred to herein, the term state can include an initial state, an intermediate state, and/or a final state. An initial state is a starting point for a machine to process an input data set according to a programming order to create an output set of data. There is an intermediate state, for example, that needs to be stored at several points to enable the processing to make forward progress. This intermediate state is sometimes stored to allow a continuation of execution at a later time when interrupted by some other process. There is also final state that can be recorded as part of the output data set.

Preemption and context switch logic 120 can also include logic to context switch another process into the APD 104. The functionality to context switch another process into running on the APD 104 may include instantiating the process, for example, through the CP 124 and DC 126 to run on APD 104, restoring any previously saved state for that process, and starting its execution.

Memory 106 can include non-persistent memory such as DRAM (not shown). Memory 106 can store, e.g., processing logic instructions, constant values, and variable values during execution of portions of applications or other processing logic. For example, in one embodiment, parts of control logic to perform one or more operations on CPU 102 can reside within memory 106 during execution of the respective portions of the operation by CPU 102.

During execution, respective applications, operating system functions, processing logic commands, and system software can reside in memory 106. Control logic commands fundamental to operating system 108 will generally reside in memory 106 during execution. Other software commands, including, for example, kernel mode driver 110 and software scheduler 112 can also reside in memory 106 during execution of system 100.

In this example, memory 106 includes command buffers 125 that are used by CPU 102 to send commands to APD 104. Memory 106 also contains process lists and process information (e.g., active list 152 and process control blocks 154). These lists, as well as the information, are used by scheduling software executing on CPU 102 to communicate scheduling information to APD 104 and/or related scheduling hardware. Access to memory 106 can be managed by a memory controller 140, which is coupled to memory 106. For example, requests from CPU 102, or from other devices, for reading from or for writing to memory 106 are managed by the memory controller 140.

Referring back to other aspects of system 100, IOMMU 116 is a multi-context memory management unit.

As used herein, context can be considered the environment within which the kernels execute and the domain in which synchronization and memory management is defined. The context includes a set of devices, the memory accessible to those devices, the corresponding memory properties and one or more command-queues used to schedule execution of a kernel(s) or operations on memory objects.

Referring back to the example shown in FIG. 1A, IOMMU 116 includes logic to perform virtual to physical address translation for memory page access for devices including APD 104. IOMMU 116 may also include logic to generate interrupts, for example, when a page access by a device such as APD 104 results in a page fault. IOMMU 116 may also include, or have access to, a translation lookaside buffer (TLB) 118. TLB 118, as an example, can be implemented in a content addressable memory (CAM) to accelerate translation of logical (i.e., virtual) memory addresses to physical memory addresses for requests made by APD 104 for data in memory 106.

In the example shown, communication infrastructure 109 interconnects the components of system 100 as needed. Communication infrastructure 109 can include (not shown) one or more of a peripheral component interconnect (PCI) bus, extended PCI (PCI-E) bus, advanced microcontroller bus architecture (AMBA) bus, advanced graphics port (AGI), or other such communication infrastructure. Communications infrastructure 109 can also include an Ethernet, or similar network, or any suitable physical communications infrastructure that satisfies an application's data transfer rate requirements. Communication infrastructure 109 includes the functionality to interconnect components including components of computing system 100.

In this example, operating system 108 includes functionality to manage the hardware components of system 100 and to provide common services. In various embodiments, operating system 108 can execute on CPU 102 and provide common services. These common services can include, for example, scheduling applications for execution within CPU 102, fault management, interrupt service, as well as processing the input and output of other applications.

In some embodiments, based on interrupts generated by an interrupt controller, such as interrupt controller 148, operating system 108 invokes an appropriate interrupt handling routine. For example, upon detecting a page fault interrupt, operating system 108 may invoke an interrupt handler to initiate loading of the relevant page into memory 106 and to update corresponding page tables.

Operating system 108 may also include functionality to protect system 100 by ensuring that access to hardware components is mediated through operating system managed kernel functionality. In effect, operating system 108 ensures that applications, such as applications 111, run on CPU 102 in user space. Operating system 108 also ensures that applications 111 invoke kernel functionality provided by the operating system to access hardware and/or input/output functionality.

By way of example, applications 111 include various programs or commands to perform user computations that are also executed on CPU 102. CPU 102 can seamlessly send selected commands for processing on the APD 104. In one example, KMD 110 implements an application program interface (API) through which CPU 102, or applications executing on CPU 102 or other logic, can invoke APD 104 functionality. For example, KMD 110 can enqueue commands from CPU 102 to command buffers 125 from which APD 104 will subsequently retrieve the commands. Additionally, KMD 110 can, together with SWS 112, perform scheduling of processes to be executed on APD 104. SWS 112, for example, can include logic to maintain a prioritized list of processes to be executed on the APD.

In other embodiments of the present invention, applications executing on CPU 102 can entirely bypass KMD 110 when enqueuing commands.

In some embodiments, SWS 112 maintains an active list 152 in memory 106 of processes to be executed on APD 104. SWS 112 also selects a subset of the processes in active list 152 to be managed by HWS 128 in the hardware. Information relevant for running each process on APD 104 is communicated from CPU 102 to APD 104 through process control blocks (PCB) 154.

Processing logic for applications, operating system, and system software can include commands specified in a programming language such as C and/or in a hardware description language such as Verilog, RTL, or netlists, to enable ultimately configuring a manufacturing process through the generation of maskworks/photomasks to generate a hardware device embodying aspects of the invention described herein.

A person of skill in the art will understand, upon reading this description, that computing system 100 can include more or fewer components than shown in FIG. 1A. For example, computing system 100 can include one or more input interfaces, non-volatile storage, one or more output interfaces, network interfaces, and one or more displays or display interfaces.

Figure 1B:
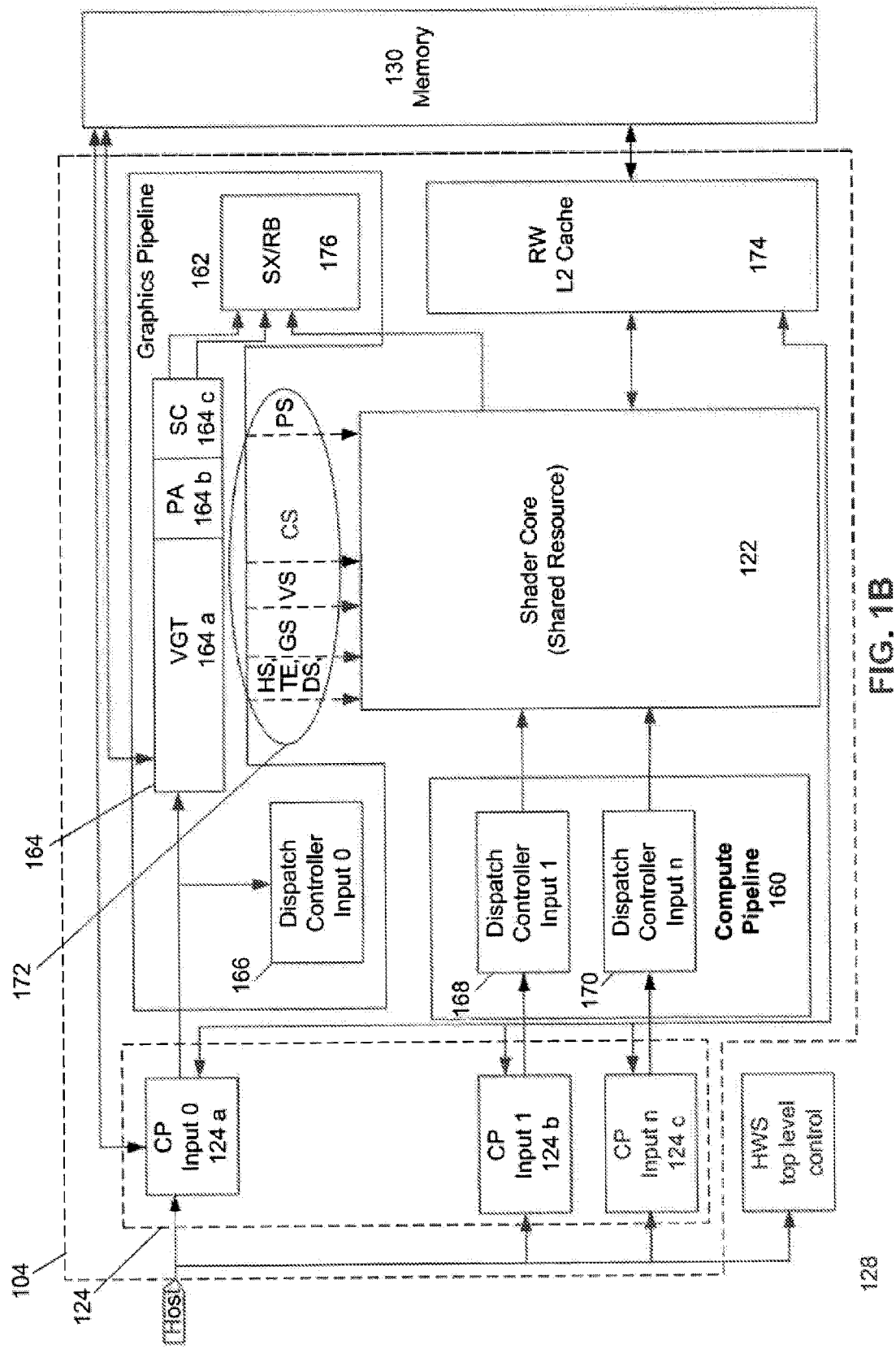
FIG. 1B is an illustrative block diagram illustration of the APD illustrated in FIG. 1A.

FIG. 1B is an embodiment showing a more detailed illustration of APD 104 shown in FIG. 1A. In FIG. 1B, CP 124 can include CP pipelines 124a, 124b, and 124c. CP 124 can be configured to process the command lists that are provided as inputs from command buffers 125, shown in FIG. 1A. In the exemplary operation of FIG. 1B, CP input 0 (124a) is responsible for driving commands into a graphics pipeline 162. CP inputs 1 and 2 (124b and 124c) forward commands to a compute pipeline 160. Also provided is a controller mechanism 166 for controlling operation of HWS 128.

In FIG. 1B, graphics pipeline 162 can include a set of blocks, referred to herein as ordered pipeline 164. As an example, ordered pipeline 164 includes a vertex group translator (VGT) 164a, a primitive assembler (PA) 164b, a scan converter (SC) 164c, and a shader-export, render-back unit (SX/RB) 176. Each block within ordered pipeline 164 may represent a different stage of graphics processing within graphics pipeline 162. Ordered pipeline 164 can be a fixed function hardware pipeline. Other implementations can be used that would also be within the spirit and scope of the present invention.

Although only a small amount of data may be provided as an input to graphics pipeline 162, this data will be amplified by the time it is provided as an output from graphics pipeline 162. Graphics pipeline 162 also includes DC 166 for counting through ranges within work-item groups received from CP pipeline 124a. Compute work submitted through DC 166 is semi-synchronous with graphics pipeline 162.

Compute pipeline 160 includes shader DCs 168 and 170. Each of the DCs 168 and 170 is configured to count through compute ranges within work groups received from CP pipelines 124b and 124c.

The DCs 166, 168, and 170, illustrated in FIG. 1B, receive the input ranges, break the ranges down into workgroups, and then forward the workgroups to shader core 122.

Since graphics pipeline 162 is generally a fixed function pipeline, it is difficult to save and restore its state, and as a result, the graphics pipeline 162 is difficult to context switch. Therefore, in most cases context switching, as discussed herein, does not pertain to context switching among graphics processes. An exception is for graphics work in shader core 122, which can be context switched.

After the processing of work within graphics pipeline 162 has been completed, the completed work is processed through a render back unit 176, which does depth and color calculations, and then writes its final results to memory 130.

Shader core 122 can be shared by graphics pipeline 162 and compute pipeline 160. Shader core 122 can be a general processor configured to run wavefronts. In one example, all work within compute pipeline 160 is processed within shader core 122. Shader core 122 runs programmable software code and includes various forms of data, such as state data.

A disruption in the QoS occurs when all work-items are unable to access APD resources. Embodiments of the present invention facilitate efficiently and simultaneously launching two or more tasks to resources within APD 104, enabling all work-items to access various APD resources. In one embodiment, an APD input scheme enables all work-items to have access to the APD's resources in parallel by managing the APD's workload. When the APD's workload approaches maximum levels, (e.g., during attainment of maximum I/O rates), this APD input scheme assists in that otherwise unused processing resources can be simultaneously utilized in many scenarios. A serial input stream, for example, can be abstracted to appear as parallel simultaneous inputs to the APD.

By way of example, each of the CPs 124 can have one or more tasks to submit as inputs to other resources within APD 104, where each task can represent multiple wavefronts. After a first task is submitted as an input, this task may be allowed to ramp up, over a period of time, to utilize all the APD resources necessary for completion of the task. By itself, this first task may or may not reach a maximum APD utilization threshold. However, as other tasks are enqueued and are waiting to be processed within the APD 104, allocation of the APD resources can be managed to ensure that all of the tasks can simultaneously use the APD 104, each achieving a percentage of the APD's maximum utilization. This simultaneous use of the APD 104 by multiple tasks, and their combined utilization percentages, ensures that a predetermined maximum APD utilization threshold is achieved.

Figure 2:
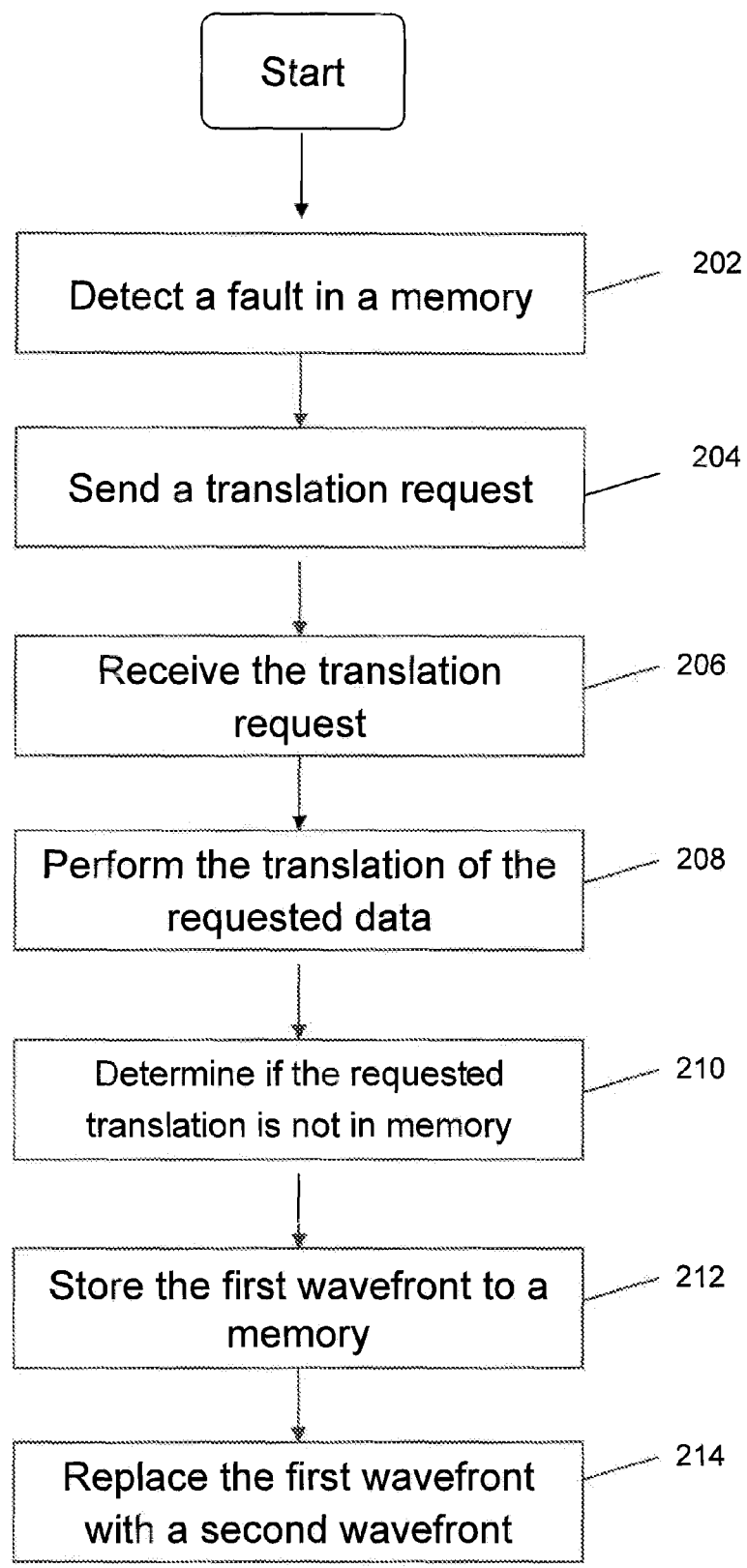
FIG. 2 is a flowchart illustrating a method for tolerating a virtual to physical address translation failure on an APD, according to an embodiment of the present invention.

As referenced in FIG. 1, APD 104 includes compute units, such as one or more SIMDs. In FIG. 2, for example, shader core 122 includes SIMDs 206A-206N for executing a respective instantiation of a particular work group or to process incoming data. SIMDs 206A-206N are respectively coupled to local data stores (LDSs) 208A-208N. LDSs 208A-208N provide a private memory region accessible only by their respective SIMDs and is private to a work group. LDSs 208A-208N store the shader program context state data. FIG. 2 is a flowchart depicting an exemplary method 200, according to an embodiment of the present invention. For ease of explanation, system 100 in FIGS. 1A and 1B, as described above, will be used to describe method 200, but is not intended to be limited thereto. In one example, method 200 can be used for allowing the APD to detect a fault associated with a wavefront and to replace the faulted wavefront with another wavefront that is ready to be executed. The method 200 may not occur in the order shown, or require all the operations.

In operation 202, the APD detects a fault in a memory. For example, the detected fault can be a page fault, a memory exception or a translation look-aside buffer (TLB) miss. The page fault or memory exception can occur when a request for data is not in system memory. The TLB miss can occur if the TLB does not have an entry corresponding to a virtual address.

According to an embodiment, the graphics memory can be a separate memory within the APD or the on-chip memory of a device, such as the SIMD. The first wavefront is removed from of the shader core and stored in memory queues of the SIMD upon receiving the not acknowledged response. According to an embodiment, the APD tracks the number of wavefronts that receive data that is not acknowledged (e.g., XNACK). If a redetermined number of a wavefronts are not acknowledged a context switching request is initiated.

According to an embodiment, the IOMMU receives a request from the APD for a translation, the IOMMU accesses a TLB with the request for data. The TLB can be implemented in the IOMMU, the APD, or separately. If the TLB does not have an entry corresponding to the virtual address when accessed, then a TLB miss occurs.

In operation 204, the APD sends a translation request that is associated with a first wavefront to a translation mechanism. In one example, the translation mechanism is a memory management unit MMU. The memory management unit can be IOMMU communicatively coupled to the APD. The IOMMU can include functionality to translate between the virtual memory address space, as seen by the APD, and the system memory physical address space.

In operation 206, the IOMMU receives the translation request associated with the first wavefront from the APD.

In operation 208, the IOMMU performs the translation of the requested data from the APD virtual address space to the physical address space. In one example, the IOMMU attempts to retrieve the data from a memory, such as system memory 106 in FIG. 1.

In operation 210, if a determination is made that the request translation is not in the system memory, a memory exception or a page fault is triggered.

In operation 212, the APD stores the first wavefront to a memory when the IOMMU sends a not acknowledged response, e.g., XNACK.

In operation 214, the APD replaces the first wavefront with a second wavefront ready to be executed. For example, the second wavefront is placed onto the shader core and executed. In another example, the first wavefront is periodically resumed as a new request to determine if a fault still exists.

Resuming a Faulted APD Wavefront

Figure 3:
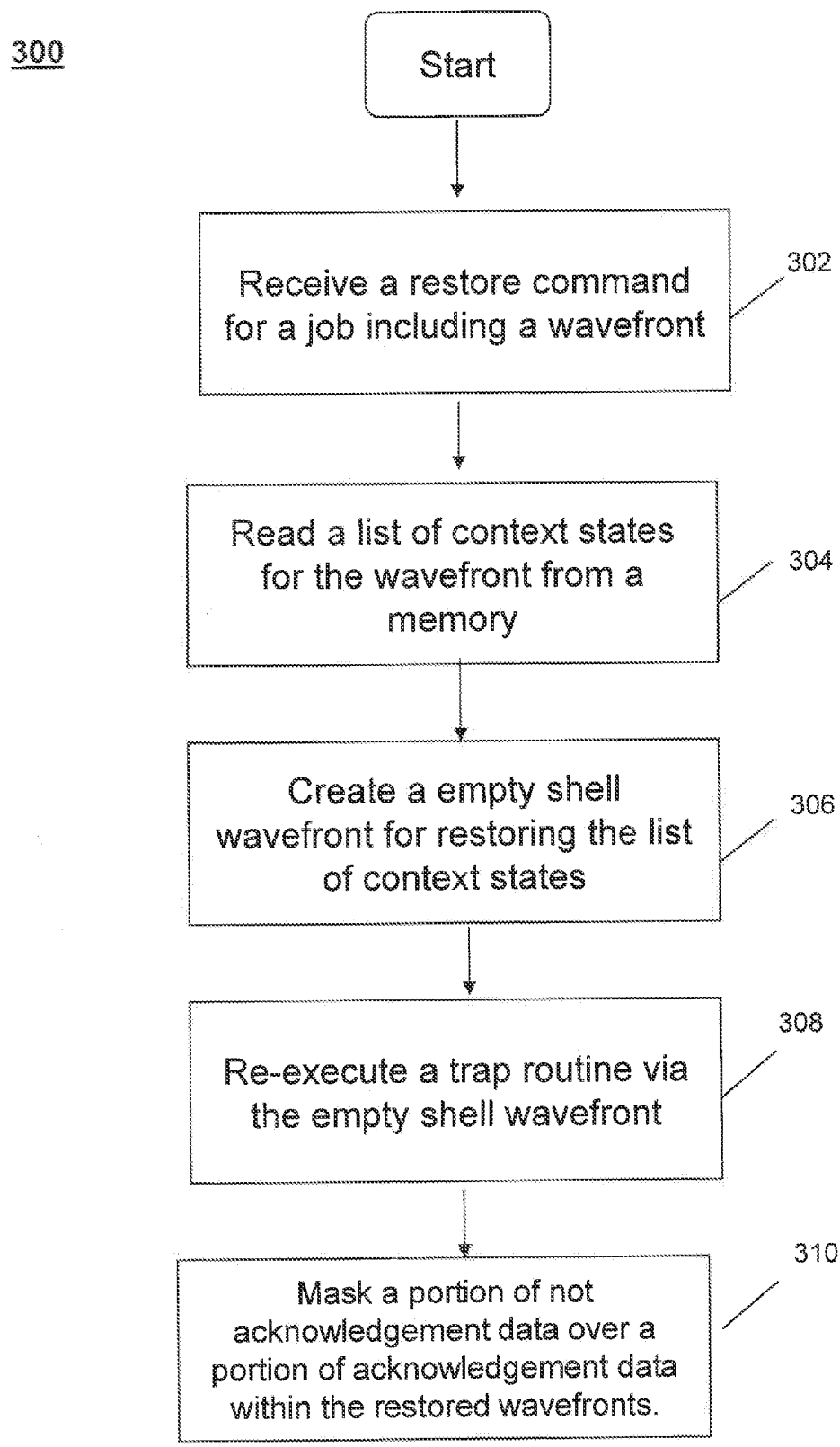
FIG. 3 is a flowchart illustrating a method for resuming a wavefront on an APD, according to an embodiment of the present invention.

FIG. 3 is a flowchart depicting an exemplary method 300, according to an embodiment. For ease of explanation, system 100 in FIGS. 1A and 1B, as described above, will be used to describe method 300, but is not intended to be limited thereto. In one example, method 300 can be used for resuming a wavefront on an APD. The method 300 may not occur in the order shown, or require all the operations.

In operation 302, the APD receives a command to restore a wavefront. The wavefront has a plurality of threads that perform a plurality of operations within the APD. In one example, a CP of the APD is in communication with a scheduler. The scheduler has access to a run-list (RL) of processes that are scheduled to run within the APD. The CP receives the command to restore the wavefront from the scheduler.

In operation 304, the command processor reads a list of context states for the wavefront from a memory. The memory can be a graphics memory, a system memory, or an on-chip device memory.

In operation 306, the CP uses the context states that were read from the memory to create an empty shell wavefront that is used for restoring the saved wavefront. For example, the empty shell wavefront launches a trap routine used to restore the wavefront. The trap routine could have been initially executed by the wavefront if an interference with a process was caused by a context switch. The wavefront of an interrupted task saves a resume instruction pointer that is used during the re-executing of the trap routine. This resume instruction pointer becomes part of the context state of the wavefront and is saved to memory.

In operation 308, the empty shell wavefront re-executes the trap routine, which launches the appropriate resources for the wavefront to be restored based on the list of context states of the wavefront within the memory. The appropriate resources can include the architectural states of the wavefront, the size of the wavefront structure, and/or bit vectors that include the status of which threads of the wavefront were acknowledged and which threads were not acknowledged.

In operation 310, a portion of not acknowledged data is masked over a portion of acknowledged data that was within the restored wavefront. In one example, the wavefront uses bit vectors to store the results of threads that have been acknowledged and not acknowledged. These results become part of the wavefront context state.

Figure 4:
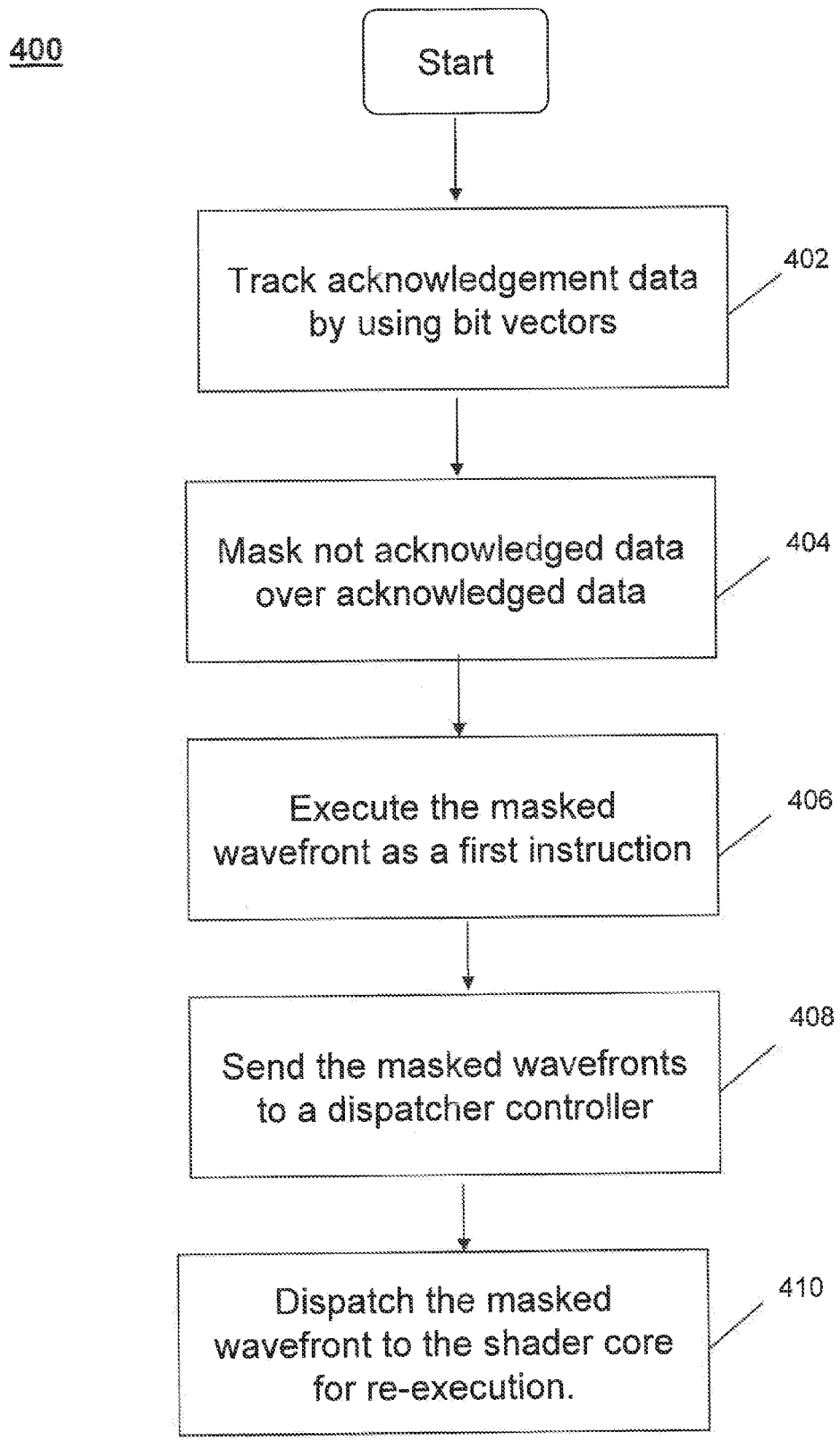
FIG. 4 is a flowchart illustrating a method for tracking acknowledgement data within a wavefront on an APD, according to an embodiment of the present invention.

FIG. 4 is a flowchart depicting an exemplary method 400, according to an embodiment. For ease of explanation, system 100 in FIGS. 1A and 1B, as described above, will be used to describe method 400, but is not intended to be limited thereto. In one example, method 400 can be used for tracking acknowledgement data within a wavefront on an APD. The method 400 may not occur in the order shown, or require all the operations.

In operation 402, the acknowledged (XACK) threads receive an XACK signal bit (e.g., XACK=1) and the not acknowledged XNACK threads receive a signal bit (e.g., XNACK=0). In one example, only the XNACK signal bits are used to create a masked wavefront.

In operation 404, the XNACK bits are masked over the XACK bits of the restored wavefront.

In operation 406, the masked XNACK signal bits become a first instruction during re-execution of the masked wavefront.

Additionally, or alternatively, in operation 408, the command processor sends the masked wavefronts to a DC. The DC can include logic that initiates threads of the wavefront in the shader core.

Additionally, or alternatively, in operation 410 the DC receives the masked wavefront and then dispatches the threads of the masked wavefront to the shader core for re-execution.

Figure 5:
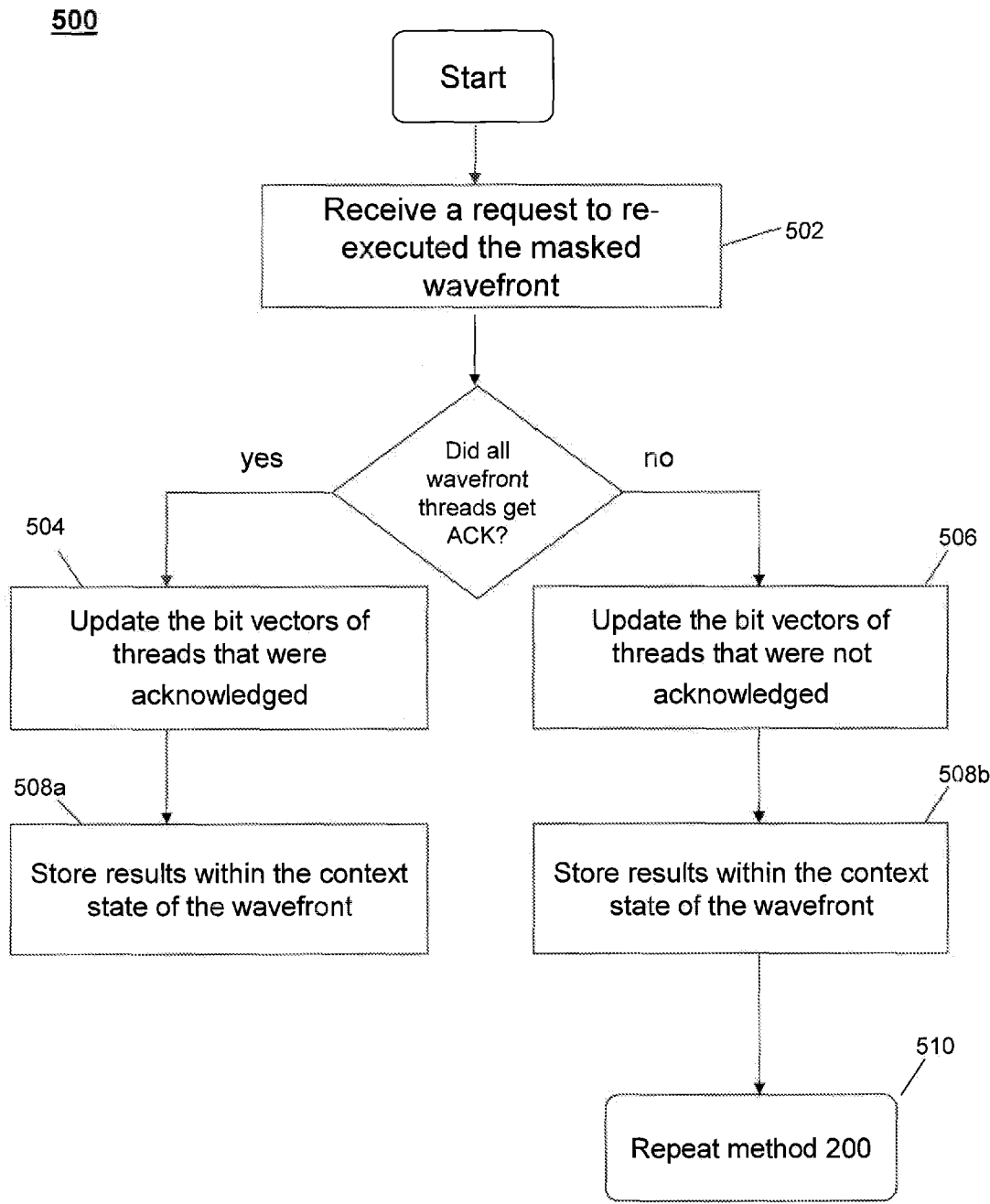
FIG. 5 is a flowchart illustrating a method for tracking the performance of threads of the wavefront on an APD, according to an embodiment of the present invention.

FIG. 5 is a flowchart depicting an exemplary method 500, according to an embodiment. For ease of explanation, system 100 in FIGS. 1A and 1B, as described above, will be used to describe method 500, but is not intended to be limited thereto. In one example, method 500 can be used for tracking the performance of threads of the wavefront on an APD. The method 500 may not occur in the order shown, or require all the operations.

In operation 502, the shader core receives a request to re-execute the masked wavefront from the DC. In one example, the masked wavefront is re-executed and a record of which threads of the operation were acknowledged and which threads were not acknowledged is maintained by the wavefront.

In operation 504, if all of the wavefront threads were acknowledged, the wavefront proceeds to update the bit vectors related to all threads.

In operation 508a, the results are stored within the context state of the wavefront once the updates have been made.

In operation 506, some of the threads of the wavefront receive not acknowledged indicators and are designated as not acknowledged threads.

In operation 508b, the results are again stored within the context state of the wavefront once the updates have been made.

In operation 510, a determination is made to retry all threads of the masked wavefront that were designated as not acknowledged threads. If the determination is positive, method 500 returns to operation 502 and is repeated periodically until all of the threads of the wavefront of the operation are acknowledged. If the determination is negative, the APD executes to the next scheduled wavefront.

FIG. 6 illustrates structures 600 associated with a wavefront, according to an embodiment. Wavefront structures 600 includes wavefronts 602, 604, and 606. For example, the wavefront structures 600 can be implemented in APD 104 on system 100 in FIG. 1A.

In one example, an empty shell wavefront 602 is a structure that is set up by a CP using context states read from a memory. The memory can be a graphics memory, a system memory, or an on-chip device memory. The CP uses information stored in a context state list associated with the wavefront to form the architectural structure of the wavefront that will accommodate a restored wavefront. The information that is stored in the context state of the wavefront can include the architectural states of the wavefront, the size of the wavefront structure, and/or bit vectors that includes the status of which threads of the wavefront were acknowledged and which threads were not acknowledged.

In one example, a restored wavefront 604 is formed when the empty shell wavefront launches a trap routine. The context states of the restored wavefront 604 are populated into the empty shell wavefront. The restored wavefront 604 maintains the results of the threads that have been previously acknowledged and previously not acknowledged by using bit vectors. For example, threads 1 through 4 of the restored wavefront 604 receive a 1 bit vector indicating that those threads have been acknowledged. Threads 5 through N of the restored wavefront 604 receives a 0 bit vector indicating that that those threads have not been acknowledged.

In yet another example, a masked wavefront 606 is formed when a mask is created by using only the not acknowledged bit vectors. In one example, a history is maintained of all threads of the wavefront. The acknowledged threads receive a 1 bit vector (e.g. XACK=1) and the not acknowledged threads receive a 0 bit vector (e.g. XNACK=0). The not acknowledged bit vectors are used to create a mask. For example, threads 5 through N of restored wavefront 604 are used to create a mask. In another example, the mask is then placed over the acknowledged bits of the restored wavefront 604 to create the masked wavefront 606. The masked bits become the first instructions of the masked wavefront 606 during re-execution.

In yet another example, a masked wavefront 606 is formed when a mask is created by using only the not acknowledged signal bit. In one example, a wavefront maintains a history of all thread operations. The acknowledged threads receive a 1 bit vector (e.g. XACK=1) and the not acknowledged threads receive a 0 bit vector (e.g. XNACK=0). The not acknowledged bit vectors are used to create a mask. For example, threads 5 through N of restored wavefront 604 are used to create a mask. In another example, the mask of not acknowledged bits is then placed over the acknowledged bits of the restored wavefront 604 to create the masked wavefront 606. The masked bits become the first instructions of the masked wavefront 606 during re-execution.

CONCLUSION

The Summary and Abstract sections may set forth one or more but not all exemplary embodiments of the present invention as contemplated by the inventors, and thus, are not intended to limit the present invention and the appended claims in any way.

The embodiments herein have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method comprising:
   detecting a fault in a memory;
   sending a command to restore a partially completed wavefront based on the fault;
   receiving the command to restore the partially completed wavefront;
   creating a shell wavefront based on the fault and a list of context states of the partially completed wavefront within the memory;
   masking the shell wavefront to form a masked wavefront; and
   restoring the masked wavefront.

2. The method of claim 1, wherein the masking comprises using bit vectors identifying at least one of portions of the wavefront that has been acknowledged and portions of the wavefront that have not been acknowledged.

3. The method of claim 2, wherein the portions of the wavefront that have or have not been acknowledged comprise threads.

4. The method of claim 3, further comprising:
   sending the masked wavefront from a command processor to a dispatch controller; and
   receiving, within a shader core, the masked wavefront from the dispatch controller for re-execution.

5. The method of claim 4, wherein the list of context states of the wavefront includes an indication of a size of the shell wavefront.

6. The method of claim 5, further comprising restoring, using a trap routine, the context states into the shell wavefront.

7. The method of claim 1, further comprising tracking, using the wavefront, a plurality of threads that receive not acknowledged and acknowledged data within a bit vectors.

8. The method of claim 7, further comprising periodically retrying a plurality of threads that receive not acknowledged data.

9. The method of claim 1, further comprising:
tracking acknowledged data as a first bit vector;
tracking not acknowledged data as a second bit vector; and
masking the second bit vector over the first bit vector to form a composite mask;
wherein the masking the shell wavefront utilizes the composite mask.

10. An apparatus, comprising:
a memory; and
an accelerated processing device coupled to the memory, wherein the accelerated processing device is configured to, based on instructions stored in the memory:
detect a fault in the memory;
create a shell wavefront based on the fault and a list of context states of a partially completed wavefront within the memory;
mask the shell wavefront to form a masked wavefront; and
restore the masked wavefront.

11. The apparatus of claim 10, wherein the mask the shell wavefront comprises using bit vectors identifying at least one of portions of the wavefront that has been acknowledged and portions of the wavefront that have not been acknowledged.

12. The apparatus of claim 11, wherein the portions of the wavefront that have or have not been acknowledged comprise threads.

13. The apparatus of claim 10, wherein the accelerated processing device is further configured to:
track acknowledged data as a first bit vector;
track not acknowledged data as a second bit vector; and
mask the second bit vector over the first bit vector to form a composite mask;
wherein the accelerated processing device is further configured to mask the shell wavefront utilizing the composite mask.

* * * * *